(12) United States Patent
Miller et al.

(10) Patent No.: US 11,105,317 B2
(45) Date of Patent: Aug. 31, 2021

(54) WIND TURBINE GENERATOR FOR LOW TO MODERATE WIND SPEEDS

(71) Applicant: 21st Century Wind, Inc., Mechanicsburg, PA (US)

(72) Inventors: William Miller, Saint Augustine, FL (US); Peder Mørck Hansen, Omaha, NE (US)

(73) Assignee: 21ST CENTURY WIND, INC., Mechanicsburg, PA (US)

(*) Notice: Subject to any disclaimer, the term of this patent is extended or adjusted under 35 U.S.C. 154(b) by 0 days.

(21) Appl. No.: 16/793,356

(22) Filed: Feb. 18, 2020

(65) Prior Publication Data

US 2020/0271103 A1 Aug. 27, 2020

Related U.S. Application Data

(60) Provisional application No. 62/808,443, filed on Feb. 21, 2019.

(51) Int. Cl.
*F03D 15/00* (2016.01)
*F03D 7/02* (2006.01)
(Continued)

(52) U.S. Cl.
CPC .......... *F03D 15/00* (2016.05); *F03D 7/0224* (2013.01); *F03D 9/25* (2016.05); *F03D 80/70* (2016.05); *H02K 7/116* (2013.01); *H02K 7/1838* (2013.01)

(58) Field of Classification Search
CPC . F03D 15/00; F03D 9/25; F03D 80/70; F03D 7/0224; F03D 1/0675; H02K 7/1838; H02K 7/116; F05B 2240/311
See application file for complete search history.

(56) References Cited

U.S. PATENT DOCUMENTS 7,042,109 B2  5/2006  Gabrys
7,381,029 B2  6/2008  Moroz
(Continued)

FOREIGN PATENT DOCUMENTS

EP  2 821 635 A1  1/2015
EP  2 837 820 A1  2/2015
(Continued)

OTHER PUBLICATIONS

GAIA Offshore Wind Turbine: Modular Rotor System; https://www.youtube.com/watch? =v=LPozkagzPVA&feature=youtu.be.
(Continued)

*Primary Examiner* — Tulsidas C Patel
*Assistant Examiner* — Joseph Ortega
(74) *Attorney, Agent, or Firm* — Roberts Calderon Safran & Cole, P.C.

(57) ABSTRACT

A 3 megawatt wind turbine generator having a rotor configured to efficiently extract power from low to moderate winds having an average speed of between about 7.5 and 8.5 meters/second is provided. The rotor includes three aerodynamic blades having an aspect ratio of 15 mounted on a modular hub. The relatively shorter and wider aerodynamic blades result in a rotor having a specific power of about 0.27, a specific power rating of about 260 watts/m², and a solidity of about 6%. The modular hub is formed from three interconnected hub sections, each of which formed from a single plate of spring steel bent along its sides into a modular shape. The bends in the plates forming the hub sections act like corrugations that more strongly resist the larger stresses applied to the hub as a result of the relatively shorter and wider aspect of the aerodynamic blades.

20 Claims, 16 Drawing Sheets

(51) Int. Cl.
*F03D 80/70* (2016.01)
*F03D 9/25* (2016.01)
*H02K 7/116* (2006.01)
*H02K 7/18* (2006.01)

(56) References Cited

U.S. PATENT DOCUMENTS

| | | | |
|---|---|---|---|
| 8,146,320 | B2 | 4/2012 | Seidel et al. |
| 8,287,423 | B2 | 10/2012 | Lopez et al. |
| 8,388,491 | B2 | 3/2013 | Ciszak et al. |
| 8,449,263 | B2 | 5/2013 | Leland |
| 8,696,315 | B2 | 4/2014 | Bonnet |
| 9,041,237 | B2 | 5/2015 | Hinken |
| 9,399,919 | B2 * | 7/2016 | Baehmann ............ F03D 1/0675 |
| 2009/0148291 | A1 | 6/2009 | Gerber et al. |
| 2011/0142658 | A1 * | 6/2011 | Bonnet ................ F03D 1/0691 |
| | | | 416/204 R |
| 2011/0243754 | A1 | 10/2011 | Luneau et al. |
| 2013/0183160 | A1 * | 7/2013 | Agtuca ................ F03D 1/0675 |
| | | | 416/228 |
| 2015/0147180 | A1 | 5/2015 | Sambamurty et al. |
| 2016/0252075 | A1 | 9/2016 | Krüger et al. |
| 2018/0135600 | A1 | 5/2018 | Ezoory |

FOREIGN PATENT DOCUMENTS

| | | |
|---|---|---|
| ES | 2 146 439 T3 | 8/2000 |
| ES | 2 545 986 T3 | 9/2015 |
| WO | 01/42647 A2 | 6/2001 |

OTHER PUBLICATIONS

Robert Harrison, Erich Hau and Herman Snel; Large Wind Turbines: Design and Economics; John Wiley. & Sons, Ltd., pp. 41-42. Printed 2001.

An Analytical Formulation for Sizing and Estimating the Dimensions and Weight of Wind Turbine Hub and Drivetrain Components; Y. Guo et al., National Renewable Energy Laboratory (NREL); NREL/TP-5000-63008; Jun. 2015.

* cited by examiner

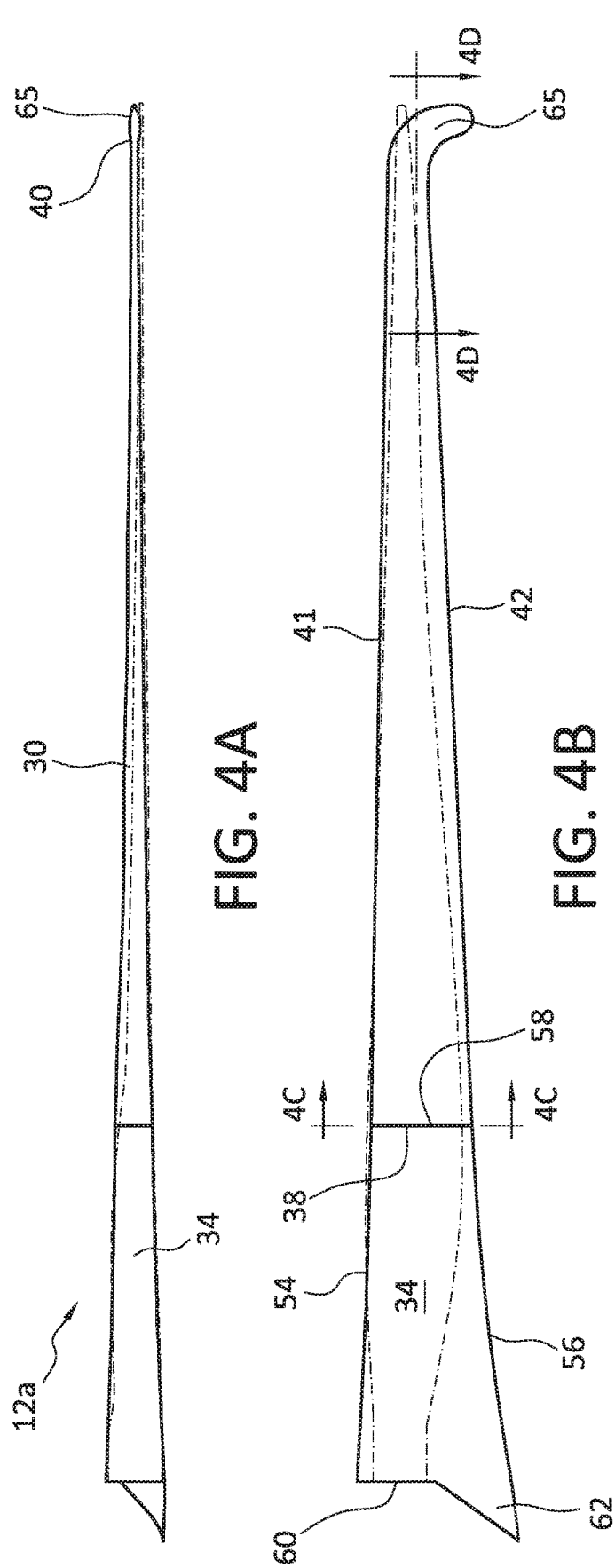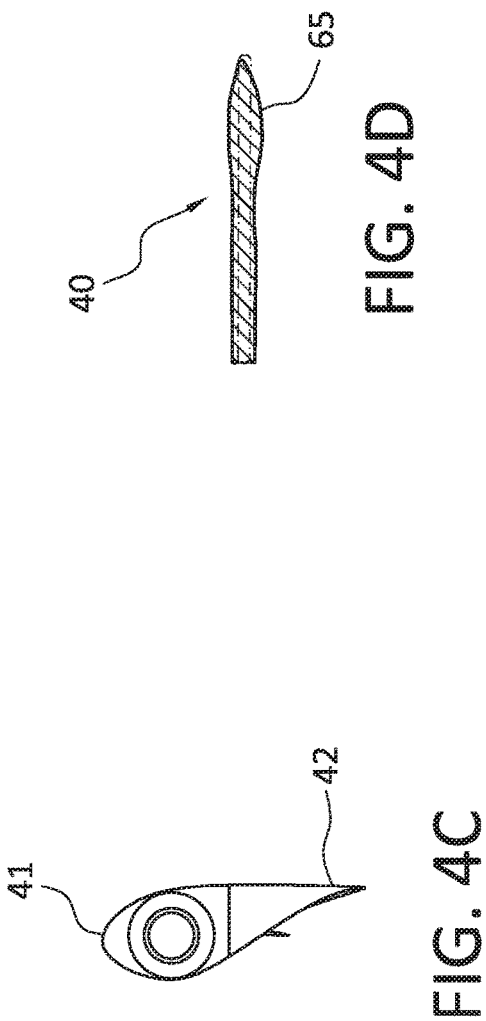
FIG. 4A
FIG. 4B
FIG. 4C
FIG. 4D

Aspect Ratio ($L^2/A$) of 3 MW Blade Without Fairing

| Segment No. | Distance Along Blade Length (m) | Chord Length (m) At Seg. Bounds | Ave. Chord Length Per Segment (m) | Area (m$^2$) Per Segment |
|---|---|---|---|---|
| 1  | 0     | 2.30  | 2.30 | 4.60  |
| 2  | 2     | 2.30  | 2.57 | 7.71  |
| 3  | 5     | 2.84  | 3.46 | 17.30 |
| 4  | 10    | 4.08  | 4.59 | 20.95 |
| 5  | 15    | 4.300 | 4.14 | 20.69 |
| 6  | 20    | 3.977 | 3.81 | 19.07 |
| 7  | 25    | 3.651 | 3.49 | 17.44 |
| 8  | 30    | 3.325 | 3.16 | 15.81 |
| 9  | 35    | 3.000 | 2.84 | 14.18 |
| 10 | 40    | 2.673 | 2.51 | 12.55 |
| 11 | 45    | 2.347 | 2.18 | 10.92 |
| 12 | 50    | 2.021 | 1.86 | 9.29  |
| 13 | 55    | 1.695 | 1.71 | .85   |
| 14 | 55.5  | 1.724 | 1.80 | .90   |
| 15 | 56    | 1.872 | 2.02 | 1.01  |
| 16 | 56.5  | 2.162 | 2.50 | 1.00  |
| 17 | 56.9  | 2.840 | 2.83 | 0.99  |
| 18 | 57.25 | 2.800 | 2.65 | 0.66  |
| 19 | 57.50 | 2.500 | 2.25 | 0.56  |
| 20 | 57.75 | 2.000 | 1.20 | 0.30  |
| 21 | 58    | .400  |      |       |

Total Area 1 blade (m2)   176.7922
Total Area 3 blades (m2)   530.3765
Swept Area (m 2)   11,297.1700
Solidity   4.7%
Aspect Ratio (L2/Area)   19
Specific Power (Power/Swept Area)   0.27
Area/Power   3.765722

FIG. 5A

Aspect Ratio ($L^2/A$) of 3 MW Blade With Fairing

| Segment No. | Distance Along Blade Length (m) | Chord Length (m) At Seg. Bounds | Ave. Chord Length Per Segment (m) | Area ($m^2$) Per Segment |
|---|---|---|---|---|
| 0 | -2 | 7.065 | 7.33 | 14.67 |
| 1 | 0 | 7.600 | 7.24 | 14.48 |
| 2 | 2 | 6.883 | 6.43 | 19.28 |
| 3 | 5 | 5.973 | 5.43 | 27.13 |
| 4 | 10 | 4.879 | 4.59 | 22.95 |
| 5 | 15 | 4.300 | 4.14 | 20.69 |
| 6 | 20 | 3.977 | 3.81 | 19.07 |
| 7 | 25 | 3.651 | 3.49 | 17.44 |
| 8 | 30 | 3.325 | 3.16 | 15.81 |
| 9 | 35 | 3.000 | 2.84 | 14.18 |
| 10 | 40 | 2.673 | 2.51 | 12.55 |
| 11 | 45 | 2.347 | 2.18 | 10.92 |
| 12 | 50 | 2.021 | 1.86 | 9.29 |
| 13 | 55 | 1.695 | 1.71 | .85 |
| 14 | 55.5 | 1.724 | 1.80 | .90 |
| 15 | 56 | 1.872 | 2.02 | 1.01 |
| 16 | 56.5 | 2.162 | 2.50 | 1.00 |
| 17 | 56.9 | 2.840 | 2.83 | 0.99 |
| 18 | 57.25 | 2.800 | 2.65 | 0.66 |
| 19 | 57.50 | 2.500 | 2.25 | 0.56 |
| 20 | 57.75 | 2.000 | 1.20 | 0.30 |
| 21 | 58 | .400 | | |

Total Area 1 blade (m2)   224.7417
Total Area 3 blades (m2)   674.2250
Swept Area (m 2)   11,297.1700
Solidity   6.0%
Aspect Ratio (L2/Area )   15
Specific Power (Power/Swept Area )   0.27
Area/Power   3.765722

FIG. 5B

| Turbine | Valid Time Steps | Hub Height Wind Speed (m/s) | Percentage Of Time Zero Power | Percentage Of Time Rated Power | Net Power (kW) | Net AEP (kWh/yr) | NCF (%) | Mean of Monthly Means Net Power (kW) | Mean of Monthly Means Net AEP (kWh/yr) | Mean of Monthly Means NCF (%) |
|---|---|---|---|---|---|---|---|---|---|---|
| 21st Century Wind (100m) | 52,560 | 8.56 | 3.5 | 33.09 | 1,475.90 | 12,929,025 | 49.2 | 1,475.00 | 12,930,048 | 49.2 |
| GE 3.2-203 (100m) | 52,560 | 8.56 | 4.08 | 5.98 | 1,315.70 | 11,525,557 | 40.73 | 1,315.33 | 11,525,533 | 40.73 |
| Vestas V90 - 3.0 MW 109.4 dB(A) (100m) | 52,560 | 8.56 | 8.07 | 5.02 | 1,099.10 | 9,627,763 | 36.54 | 1,099.33 | 9,627,739 | 36.64 |
| Enercon E-82 E3 / 3,000 kW (100m) | 52,560 | 8.56 | 3.52 | 5.89 | 1,008.10 | 8,831,247 | 33.6 | 1,008.30 | 8,831,790 | 33.6 |
| Gamesa G114-2.5 MW (100m) | 52,560 | 8.56 | 3.49 | 10.99 | 1,258.90 | 11,028,275 | 50.36 | 1,299.03 | 11,028,716 | 50.36 |

FIG. 6C

| Turbine | Valid Time Steps | Hub Height Wind Speed (m/s) | Percentage Of Time Zero Power | Percentage Of Time Rated Power | Net Power (kW) | Net AEP (kWh/yr) | NCF (%) | Mean of Monthly Means Net Power (kW) | Mean of Monthly Means Net AEP (kWh/yr) | Mean of Monthly Means NCF (%) |
|---|---|---|---|---|---|---|---|---|---|---|
| 21st Century Wind (100m) | 99,519 | 6.65 | 7.47 | 13.99 | 1,018.10 | 8,918,448 | 33.94 | 1012.80 | 8,872,443 | 33.76 |
| GE 3.2-203 (100m) | 99,519 | 6.65 | 8.08 | 1.37 | 850 | 7,446,258 | 26.32 | 843.7 | 7,390,585 | 26.12 |
| Vestas V90 - 3.0 MW 109.4 dB(A) (100m) | 99,519 | 6.65 | 12.21 | 1.31 | 670.2 | 5,870,945 | 22.34 | 663.3 | 5,810,510 | 22.11 |
| Enercon E-82 E3 / 3,000 kW (100m) | 99,519 | 6.65 | 7.49 | 1.34 | 607.3 | 5,320,006 | 20.24 | 600.9 | 5,263,938 | 20.03 |

FIG. 7

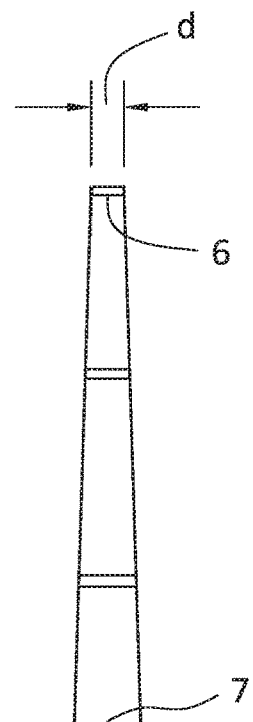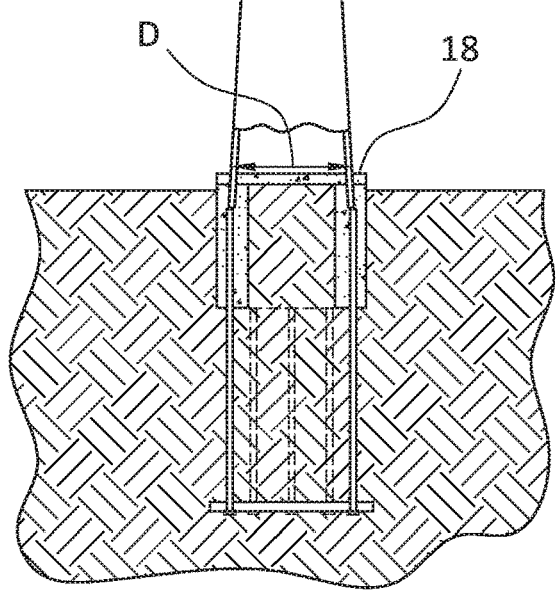
FIG. 13

WIND TURBINE GENERATOR FOR LOW TO MODERATE WIND SPEEDS

FIELD OF THE INVENTION

This invention relates to wind turbine generators, and is specifically concerned with a wind turbine generator having a rotor configured to efficiently extract power from low to moderate winds having an average speed of between about 7.5 and 8.5 meters/second.

BACKGROUND OF THE INVENTION

Wind turbine generators constitute an important and growing segment of renewable energy production, and energy production in general. In July of 2008, the U.S. Department of Energy published a report outlining a goal of increasing wind energy's contribution to the U.S. energy supply to 20% by 2030. Some states have outlined even more ambitious plans. In October of 2015, Governor Brown of California signed legislation requiring 50% of that state's energy to come from renewable energy sources, with wind energy being a substantial contributor to the increase. In his State of the State address in January of 2019, Governor Cuomo of New York proposed quadrupling that state's offshore wind target to 9 gigawatts by 2035. Additionally, thirty-five other states presently offer substantial tax incentives for the development of wind energy.

To meet the demand for increased energy production, the manufacturers of wind turbine generators have produced ever larger units. For example, in 2000, the average wind turbine generator produced about 700 kilowatts with a rotor diameter of about 50 meters. Today a typical on-shore wind turbine has a nameplate capacity of between 3,000 to 5,000 kilowatts (kW) with rotor diameters above 125 meters. Additionally, in order to maximize energy production, the rotor and generator-containing nacelle of such wind turbines are supported on a vertical tower typically over 100 meters tall and positioned at moderate to high wind areas where average wind speeds range between 7.5 and 9.0 meters per second (m/s).

While the strategy of generating more power from larger rotors on taller towers at moderate to high wind areas has worked in the past, there are a number of practical constraints that mandate the use of different strategies if the aforementioned federal and state goals of increased production are to be met. For example, there are only a limited number of areas having moderate to high winds, and fewer still that are close enough to the urban or suburban areas where energy produced is consumed so as to keep power transmission losses to within acceptable ranges. Additionally, some moderate to high wind areas do not have a sufficient transportation infrastructure in the form of a railway or adequate roads to receive the delivery of the large and heavy component parts of today's high-power output wind turbines. The recognition of these limitations has inspired the development of wind turbine generators specifically designed to efficiently capture energy from low to moderate winds having speeds of between 6.0 and 7.5 m/s, as there are many more such areas than moderate to high wind areas that are close to both the ultimate consumers of the electrical power generated, and a railway or road capable of transporting the large component parts of such wind turbines.

SUMMARY OF THE INVENTION

For wind turbines with generators of 2,700 kW or more in low to moderate wind areas, the industry trend has been to use rotors having diameters between 115 and 122 meters that are mounted on support towers 100 meters or more in height. The aerodynamically-shaped blades of the rotors have an over-all length of between 55 and 60 meters, and typically have a long and narrow aspect, e.g. an aspect ratio of length to width exceeding 20. While such a design is capable of generating significant power in low to moderate wind speeds of between 6.0 and 7.5 m/s, the applicant has observed a number of shortcomings in such a design strategy that limits it overall ability to efficiently convert wind to electrical energy. First, the long, narrow aspect ratio of conventional blades used in such designs limits the specific power of the three-bladed rotor to between about 231-241 watts per square meter (W/m$^2$). While a higher specific power could be realized by simply widening the blades, such widened blades would apply increased moment forces on the blade hub and on the driveshaft connecting the hub to the gear box and generator contained within the nacelle. The resulting stresses on the hub and bending forces applied to the drive shaft would accelerate the fatigue and wear on the hub as well as the gears within the gearbox such that the resulting additional maintenance expenses would negate the advantages associated with any increases in efficiency. Second, the applicant has observed that the wound coil-type generators used in prior art wind turbines lose a substantial amount of efficiency at the lower rotor speeds associated with the lower wind speeds. To compensate for this deficiency, some conventional wind turbines use three or four stage gear boxes capable of increasing the rotational speed inputted by the drive shaft from 10 rpms to 1200 rpms. However, such a solution would render the gearbox more vulnerable to damage if wider blades were used due to the increased bending forces associated with such wider blades. Such increased bending forces would cause the internal gears of the gear box attached to the rotor drive shaft to periodically squeeze against other gears or shafts, thereby accelerating wear and maintenance procedures. Finally, the applicant has observed that the one-piece, cast hubs used in wind multi MW turbines are often so large and heavy that they cannot be cost-effectively transported to many moderate to low wind areas. Even when such transportation is feasible, the need to raise such heavy single-piece cast hubs to the top of the support tower makes assembly of the wind turbine difficult.

To these ends, the wind turbine generator of the invention is configured with a 3.0 MW generator and can produce significantly more power from winds having an average wind speed of between about 6.0 and 7.5 meters/second by means of a rotor including three aerodynamic blades having an aspect ratio of between about 17 and 15 mounted on a plate-style, modular hub.

The relatively shorter and wider aerodynamic blades result in a rotor having a specific power of between about 0.25 and 0.29, a specific power rating of between about 240 and 260 watts/m$^2$, and a solidity of between about 5% and 6%. Each of the blades preferably includes an aerodynamic surface over its entire length from a proximal end that is mounted on the modular hub to its distal end. In a preferred embodiment, each blade includes a blade portion having a length that terminates in the blade tip; a blade root connected between the blade portion, and the hub, and an aerodynamic fairing that covers the length of the blade root such that the entire length of the blade includes an aerodynamic, energy-generating surface. The tip end of each blade may include a rearward blade sweep to increase the energy-capturing area. The blade root is preferably formed from a material such as rolled steel that is less flexible than the material forming the blade portion to prevent the higher moment forces applied to the relatively shorter and wider blades during high-wind conditions from bending the blades to the extent that they collide with the support tower. The length of the blade root is between about 20% and 30% of the over-all length of the blade so that the stiffening that the blade root imparts to the overall blade is substantial. The length of each of the aerodynamic blades is preferably no more than about 65 meters to facilitate the transportation and assembly of the wind turbine generator. The tip end of each blade may include a rearward blade sweep to increase the energy-capturing area without extending the length of the blade. Surprisingly, the applicant has observed that such a wider blade is substantially better in converting low winds having speeds of less than 7.5 m/s into electrical power than conventional, relatively longer and thinner blades, which in turn results in a higher-than-expected energy output.

The hub is preferably a modular hub formed from three interconnected hub plate sections, each of which is formed from a single plate of resilient steel bent along its sides into a modular shape. Each hub section includes a central, plate-shaped blade mounting portion flanked by side connecting flanges that are integrally formed with the blade mounting portion by bends. Each side connecting flange is connectable to a side connecting flange of another hub section. The hub may further include a mounting plate connected to a drive shaft, and a cap plate connected to a front of the hub. Each hub section may further include front and back connecting flanges that are integrally formed with the blade mounting portion by bends, wherein the front and back connecting flanges are connectable to the cap plate and the mounting plate, respectively. The modular structure of the hub allows it to be easily transported in three pieces, thus facilitating the transportation and assembly of the moderate to low wind turbine generator of the invention. Additionally, the connections between the interconnected side flanges of the hub sections provide an additional area where the stresses applied at the joint between the blade roots and the hub sections can advantageously be absorbed. By contrast, in conventional single-piece hub designs, all of these stresses are focused exclusively at the joint between the blade and the hub, eventually deforming each of blade-receiving circular mounting holes in the hub to ovals. Finally, the manufacturing costs are less than that of a single-piece cast hub. Single-piece cast hubs are difficult to manufacture because of their large size, and must be rejected upon final inspection if any one portion does not conform to specification. Consequently, such conventional, single-piece cast hubs have a high manufacturing rejection rate of nearly 50%. By contrast, the hub sections of the plate-type modular hub are easier to manufacture and would have a substantially lower rejection rate.

The use of a plate-type modular hub in combination with the stiff blade roots advantageously overcomes the problems associated with the use of the relatively wider blades used in the wind turbine of the invention. While the wider blades produce higher moment forces at the hub than conventional, narrower blades of the same length, the bends in the plates forming the hub sections act like corrugations that more strongly resist the resulting flexing of the blades toward the support tower of the wind turbine generator than the partial spherical-shell of steel used in conventional hub designs. These features, in combination with the stiffening of the blades of the invention through the use of a steel blade root that is between 20% and 30% of the overall length of the blade, prevent the blades from flexing to the point of colliding with the support tower even under sustained gusts of abnormally high winds.

The wind turbine generator may further comprise a nacelle including a support plate, and a gear train to an input shaft of a generator. A drive shaft connected between the hub and an input shaft of the gear train transmits the torque generated by the rotor to the gear train and generator. Preferably, the drive shaft is rotatably supported by a pair of spaced-apart bearings mounted on the support plate that are configured to isolate the input shaft of the gear train from bending forces applied to the distal end of the drive shaft by the plurality of aerodynamic blades. Additionally, the generator housed within the nacelle is preferably a high density, permanent magnet generator as such generators more efficiently convert torque into electrical power at the lower rotational speeds associated with low to moderate winds. This characteristic of a permanent magnet generator also allows the use of a simpler, planetary gear type gear train having a gear ratio on the order of 1:10 which is more reliable and robust and which requires less maintenance than the 1:100 gear ratio drive trains used in most prior art wind turbine generators.

The support tower of the wind turbine generator is preferably a low-weight, modular plate-type support tower. Additionally, the ratio of the diameter d of the yaw bearing that defines the diameter of the top end of the support tower and the diameter D of the bottom end of the support tower just above the foundation is preferably between about 1.7 to 2.1. By contrast, in prior art support towers, this ratio is no more than about 1.37. Such proportioning of the upper and lower diameters d and D lowers the pressure that the inventive wind turbine generator 1 applies to the foundation by about 50%, since the weight of the wind turbine generator is distributed over twice the area of a conventional wind turbine generator. The use of a lower weight modular, plate-type support tower lowers the overall weight of the support tower typically by about 50,000 pounds, such that the pressure applied by the wind turbine generator to the foundation is reduced by an additional 16%. The resultant lower pressure not only allows the thickness of the foundation to be reduced 60% to 66%, but also allows relatively low-cost, conventional concrete to be used instead of high-cost, high-pressure rated concrete. The substantially thinner foundation also substantially reduces the over-all amount of concrete needed to construct the foundation. This not only reduces the labor and material costs of construction, but also minimizes the amount of water runoff associated with the foundation, as the substantially smaller foundation allows more of the surrounding terrain to maintain its water absorbency. All of these factors are particularly important for the wind turbine generator of the invention, which will likely be constructed on ridges or other high terrain in order to gain exposure to the highest winds in the low-to-moderate wind areas where these turbines are to be built.

Finally, none of the power conditioning components of the wind turbine generator of the invention are located within the support tower. Instead, these components are located in a separate building outside of the wind turbine generator. Such a design advantageously removes the sensitive power conditioning equipment that converts the DC current generated by the permanent magnet generator into usable AC current from the mechanical shocks and vibration present within the support tower, thereby reducing the need for maintenance and prolonging the life of this equipment.

BRIEF DESCRIPTION OF THE DRAWINGS

FIG. 4A is an edge-on view of the inventive blades used in the wind turbine generator of FIG. 1;

FIG. 4B is a plan view of the blade of FIG. 4A;

FIG. 4C is a cross-sectional view of the blade along the line 4C-4C of FIG. 4B, and FIG. 4D is a cross-sectional view of the blade along the line 4D-4D of FIG. 4B.

The profile of a conventional blade is superimposed over FIGS. 4A, 4B and 4D to illustrate differences both in shape and width.

FIG. 5A and FIG. 5B are tables for the inventive blade without a fairing and with a fairing, respectively illustrating the incremental changes in the length of the chord of the inventive blade per incremental changes along the length of the inventive blade, and setting forth the resulting solidity, aspect ratio, specific power per swept area, and area per unit power.

Figure 6A:
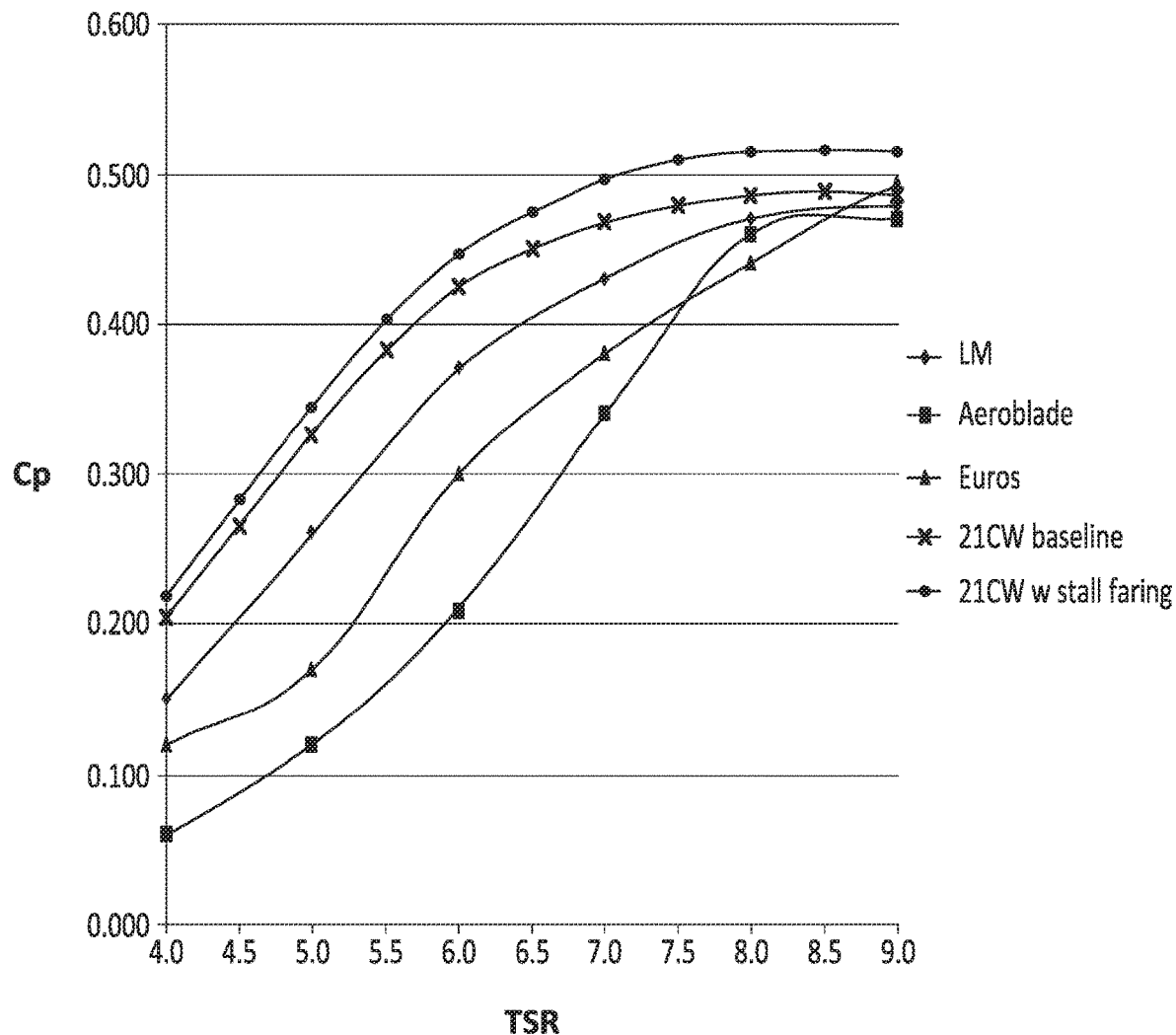

FIG. 6A is a Cp graph illustrating the relative power generating performance of the blade of the invention both with the fairing ("21 CW w stall fairing") and without ("21 CW baseline") as compared to four different commercially-available blades. Here, Cp is the ratio between the resulting rotor power and the dynamic power in the wind, while TSR is the ratio between the speed of the rotating blade tip to the speed of the wind.

Figure 6B:
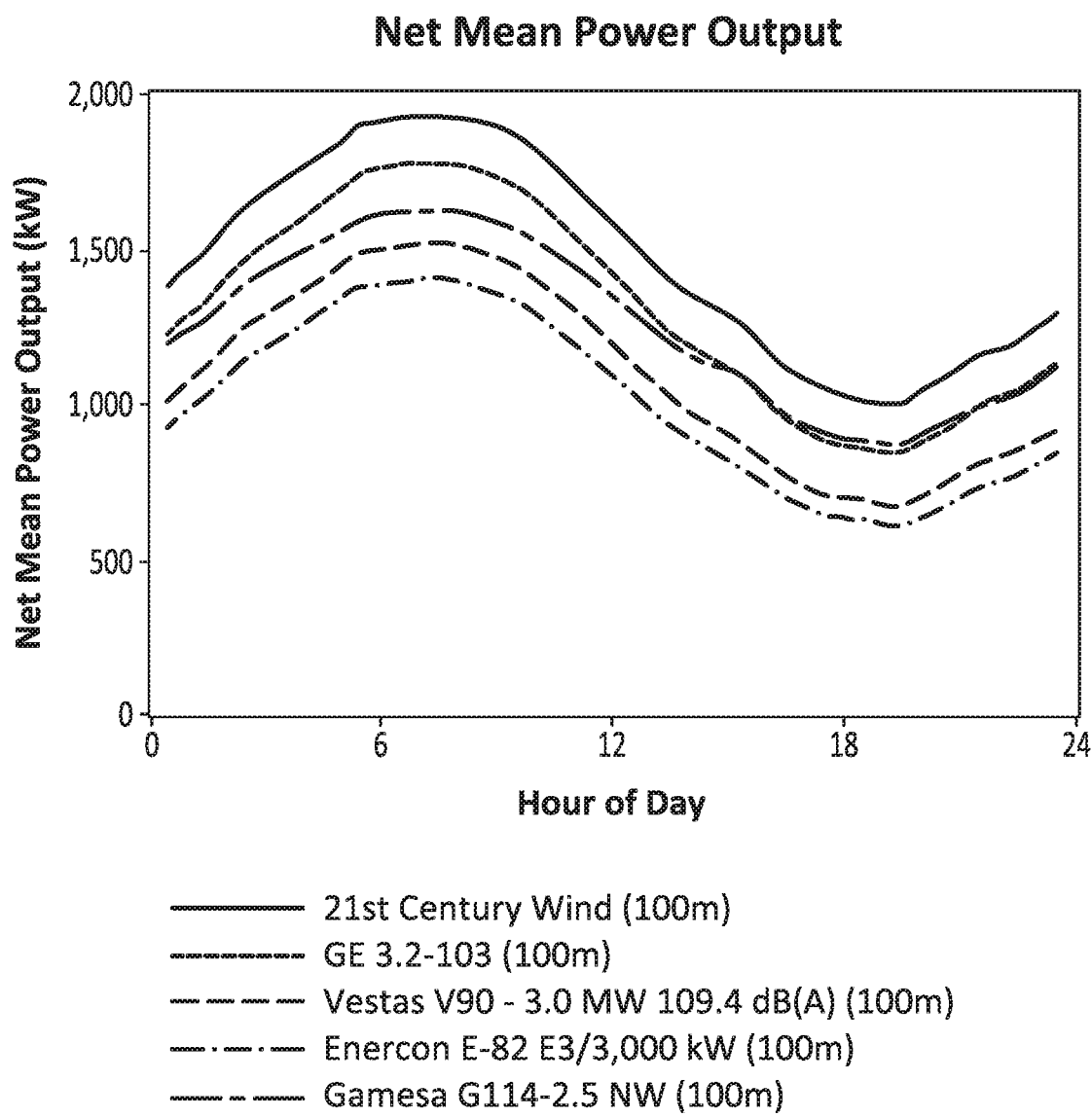
Figure 8A:
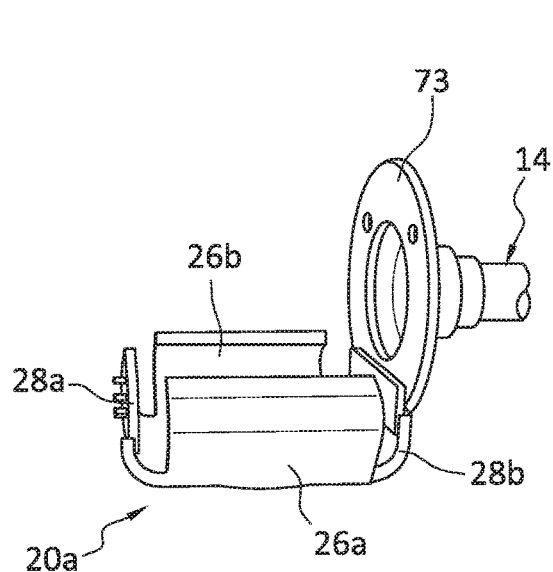
Figure 8B:
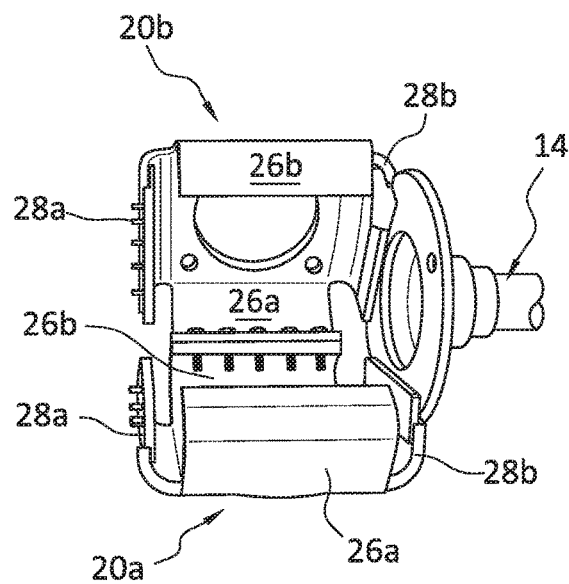
Figure 8C:
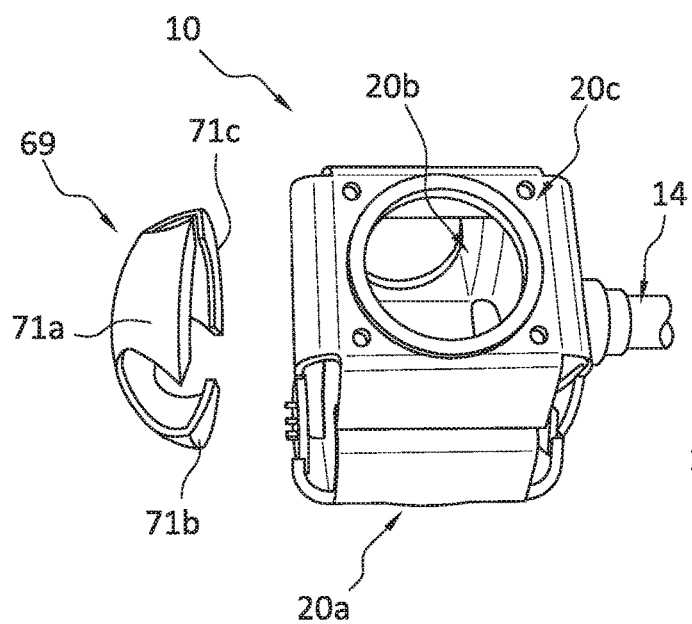
Figure 8D:
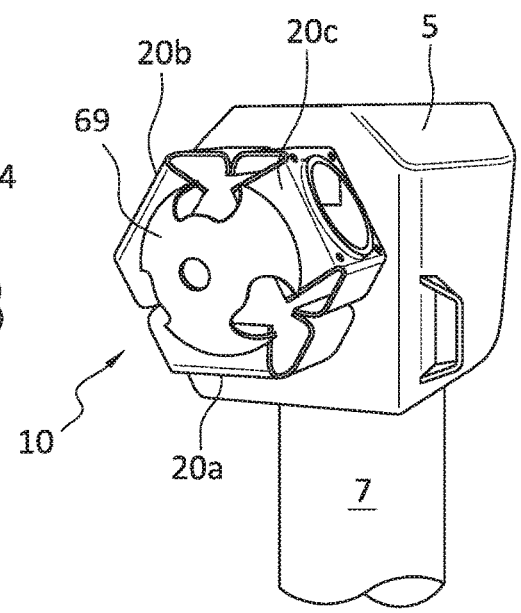

FIG. 6B is a graph comparing the net mean power output of a 3 megawatt rotor 3 using the inventive blades with four commercially-available, 3 megawatt rotors using conventional blades.

FIG. 6C is table summarizing the information contained in the graph of FIG. 6B comparing the annual and monthly power generating performance of the inventive blade with three commercially-available blades for a wind speed of 8.56 m/s.

FIG. 7 is table comparing the annual and monthly power generating performance of the inventive blade with three commercially-available blades for a low wind speed of 6.65 m/s.

FIGS. 8A-8D are perspective views illustrating the assembly of the hub sections to the drive shaft of the wind turbine generator.

Figure 9:
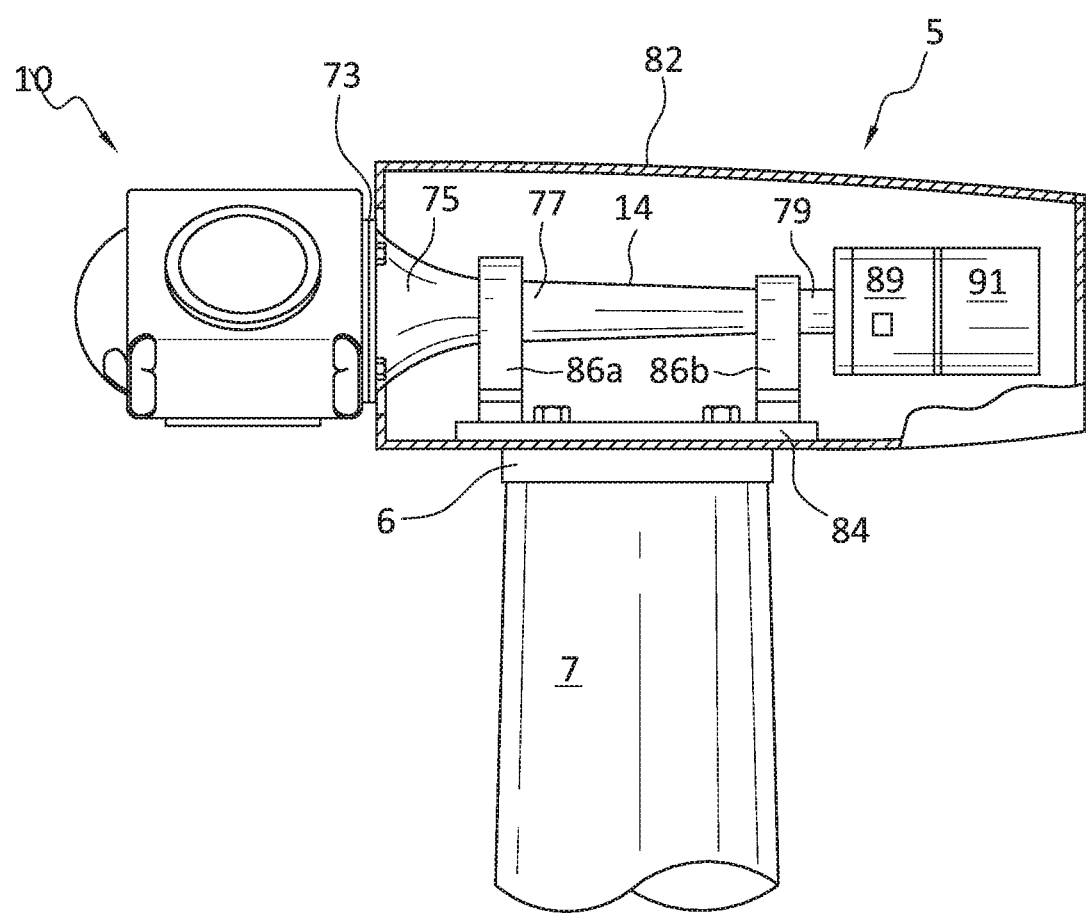

FIG. 9 is a side view of the nacelle of the wind turbine generator with the nacelle housing shown in cross section.

Figure 10:
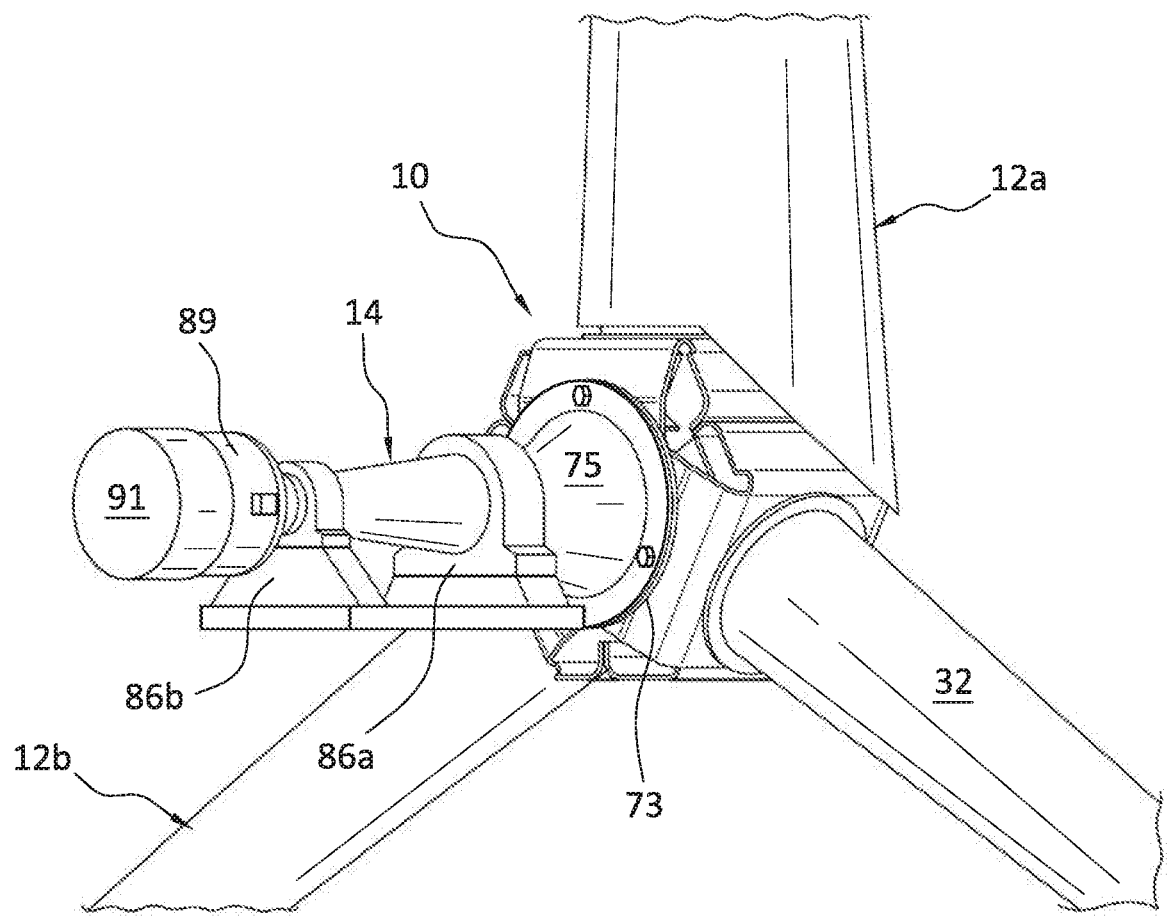

FIG. 10 is a back, perspective view of the rotor, bedplate, drive shaft, bearings and combination gearbox and generator drawn without the nacelle housing.

Figure 11:
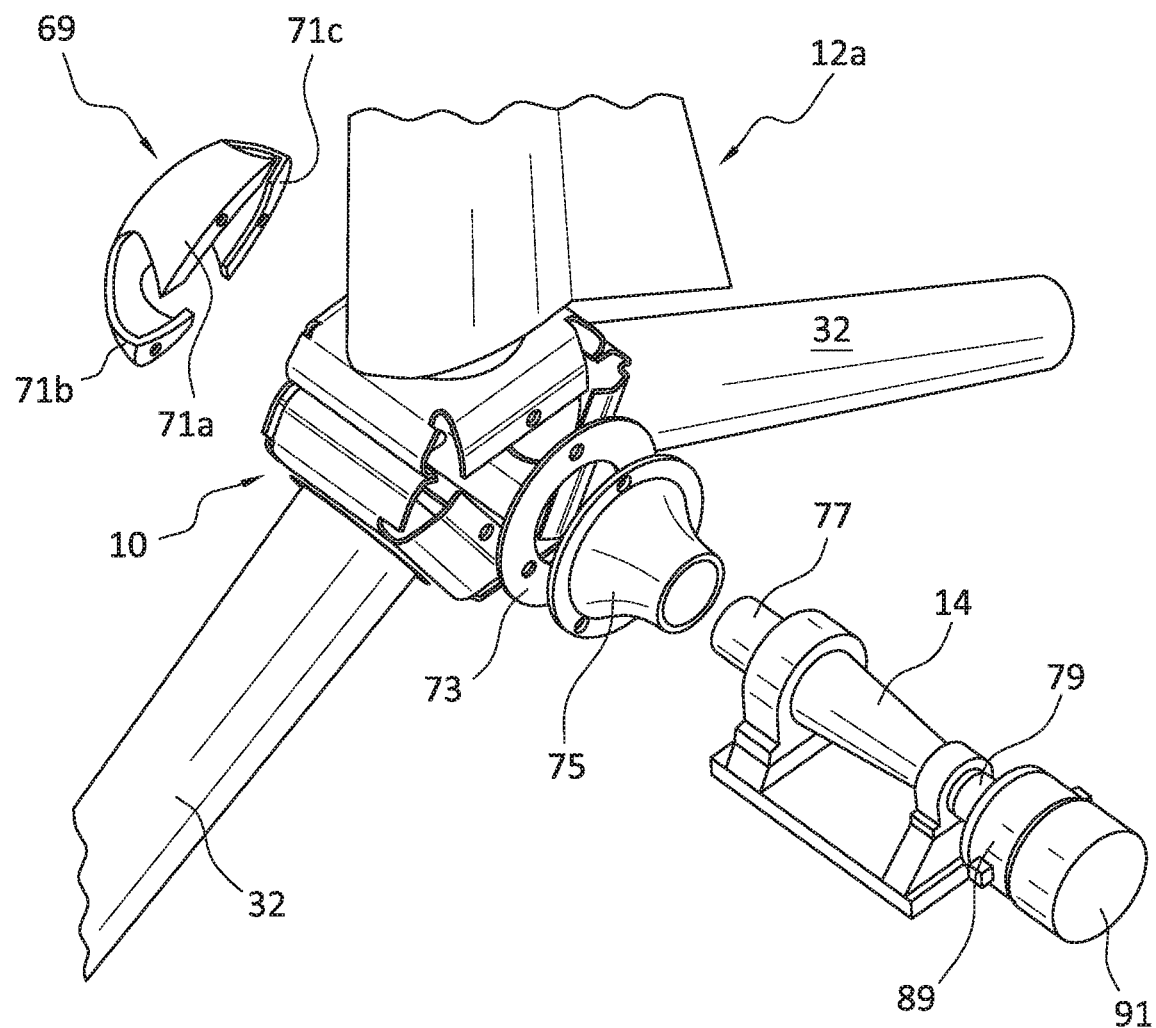

FIG. 11 is an exploded perspective view of the rotor, bedplate, drive shaft, bearings and combination gearbox and generator drawn without the nacelle housing.

Figure 12A:
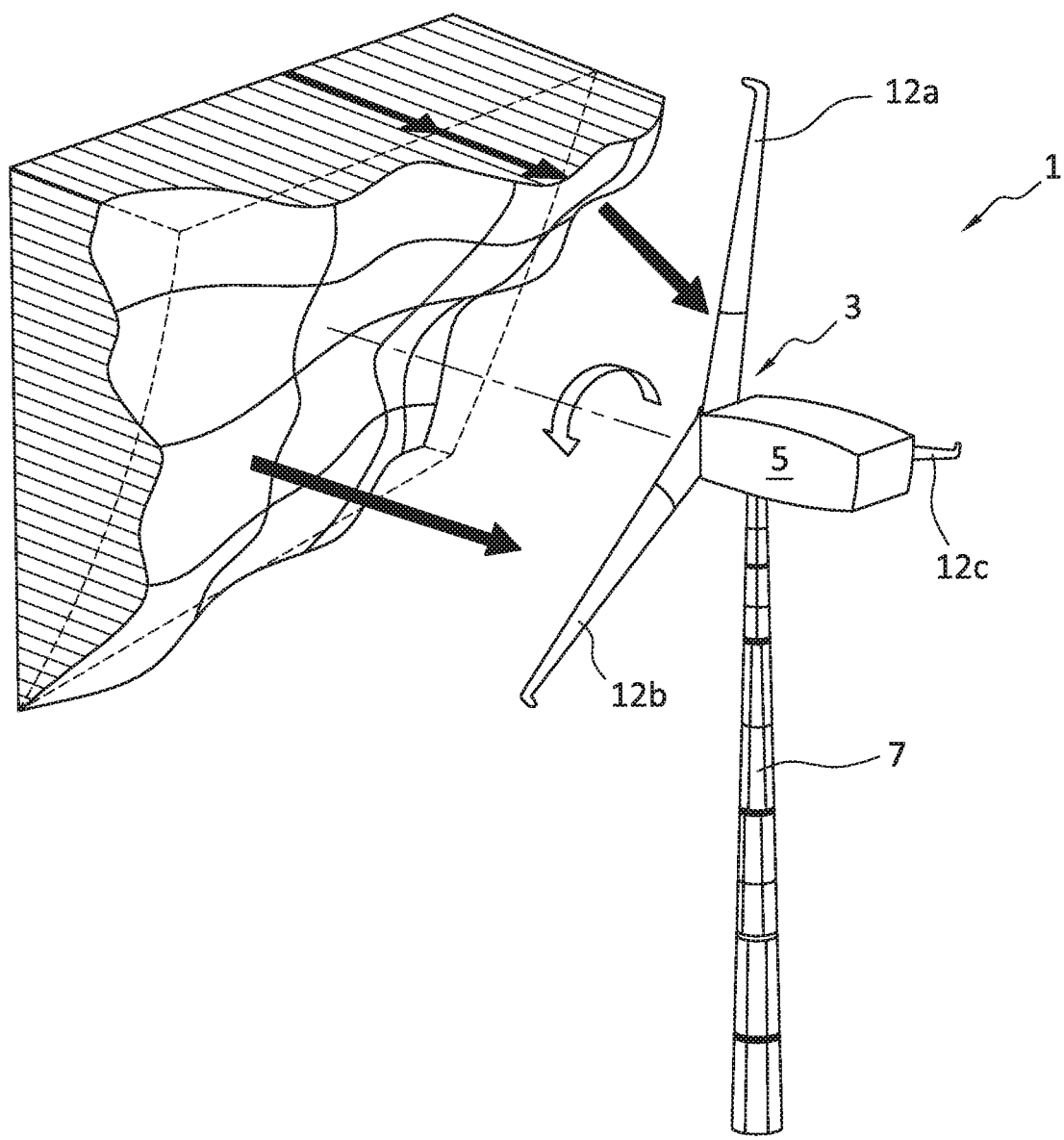
Figure 12B:
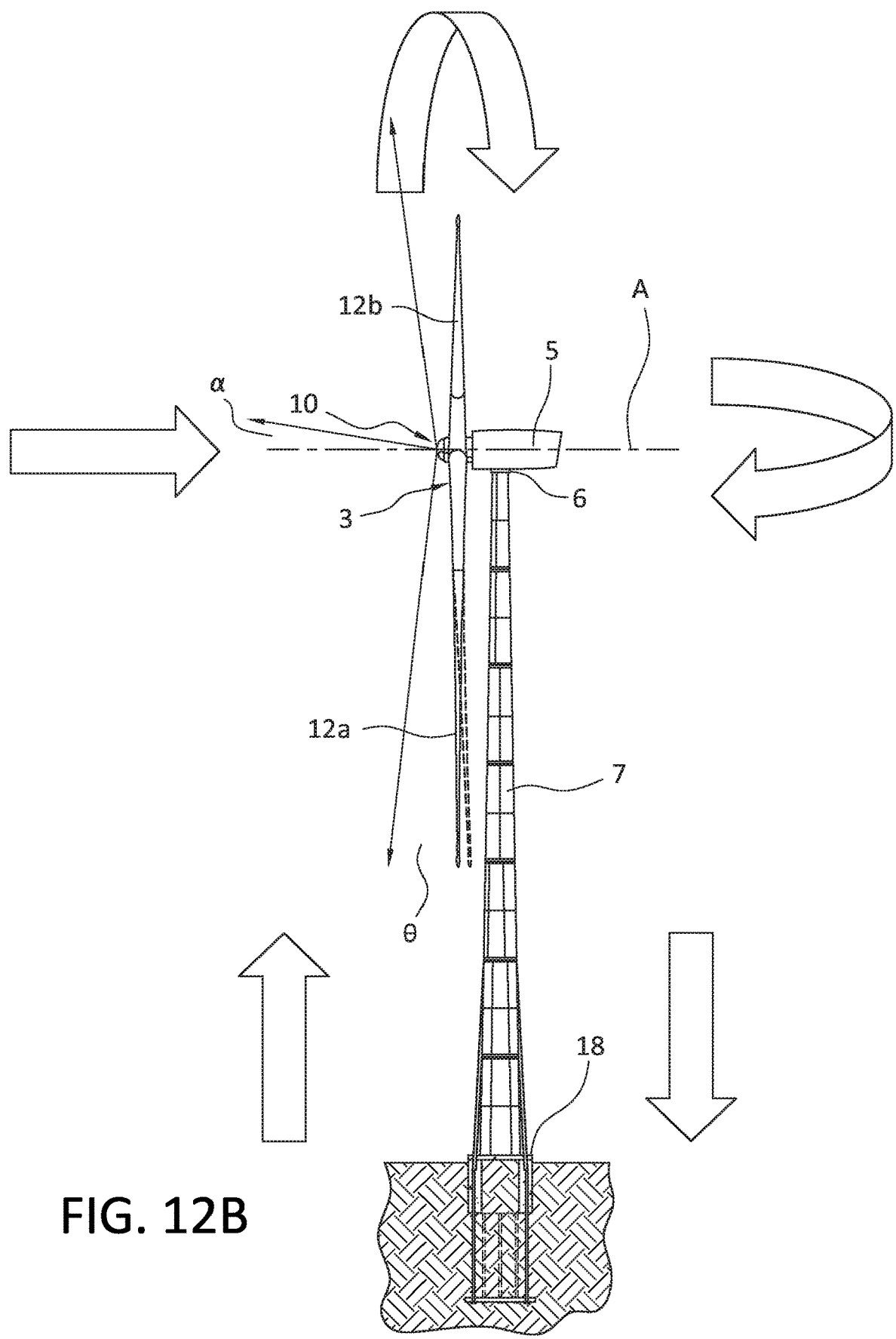

FIG. 12A is back, perspective view of the wind turbine generator and three-dimensional wind gradient graph illustrating in particular variations in the wind speed along the vertical axis, while FIG. 12B is side view of the wind turbine generator of FIG. 12A illustrating the flexing of the blades toward the support tower as they rotate into the 6 o'clock position.

FIG. 13 is a front view of the support tower without the nacelle and rotor to more clearly illustrate the ratio between the top and bottom diameters of the support tower.

DETAILED DESCRIPTION OF THE PREFERRED EMBODIMENT

Figure 1:
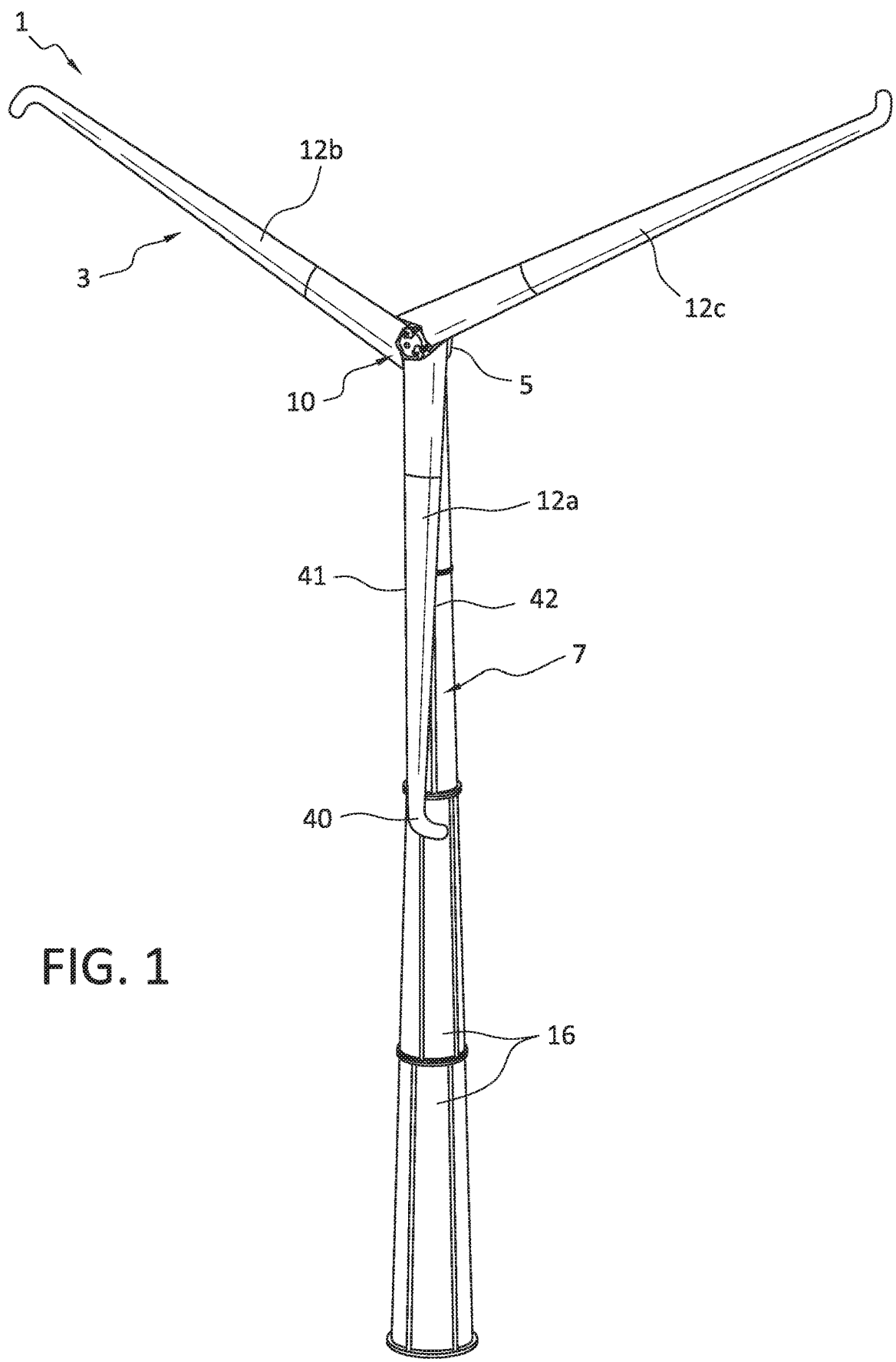
FIG. 1 is a front perspective view of the wind turbine generator of the invention.
Figure 2:
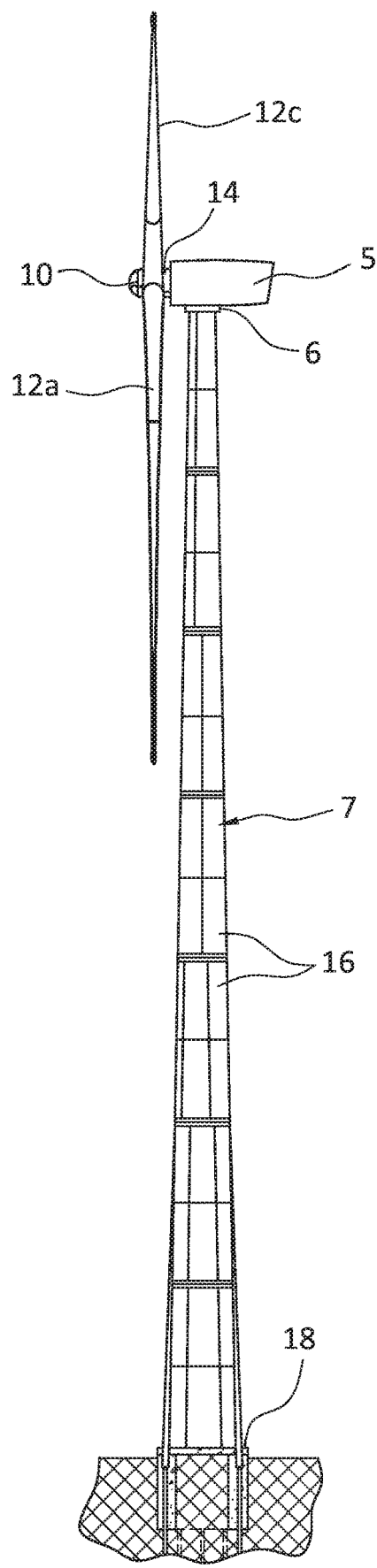
FIG. 2 is a side view of the wind turbine generator of FIG. 1.

With reference to FIGS. 1 and 2, the wind turbine generator 1 of the invention generally comprises a rotor 3, a nacelle 5 containing a gearbox and a generator, and a support tower 7 formed from a plurality of interconnectable plates 16. The bottom end of the support tower is mounted on a disc-shaped foundation 18 buried in the surrounding soil. The nacelle 5 is rotatably connected to the top end of the support tower by means of a yaw bearing 6. The rotor 3 and nacelle 5 are maintained in an orthogonal orientation with respect to the wind by means of the yaw bearing 6 and yaw motors (not shown) contained within the nacelle 5.

The rotor 3 includes a hub 10, three blades 12a, 12b, and 12c angularly spaced 120° from one another, and a driveshaft 14. The driveshaft 14 is connected at one end to the hub 10, and to the gearbox (not shown in FIGS. 1 and 2) within the nacelle 5.

Figure 3A:
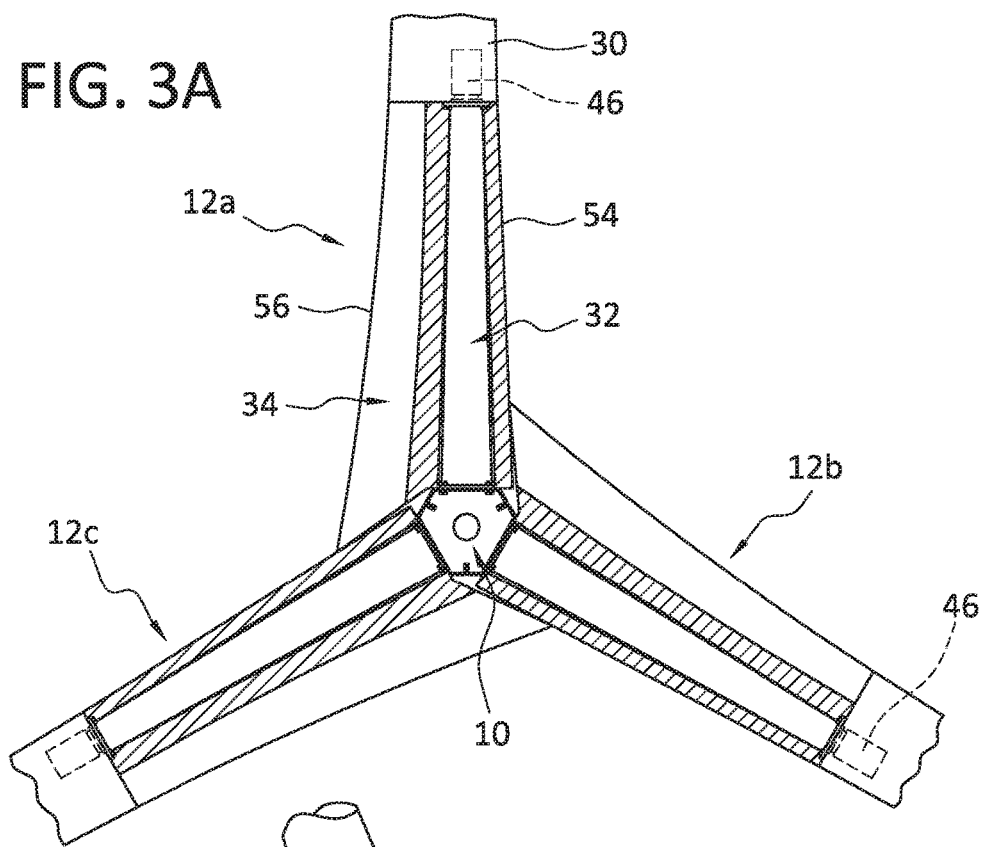
FIG. 3A is a front view of the rotor of the wind turbine of FIG. 1, showing the modular hub, the blade root extensions connecting the blade portions to the hub, and the fairings covering the blade root extensions.
Figure 3B:
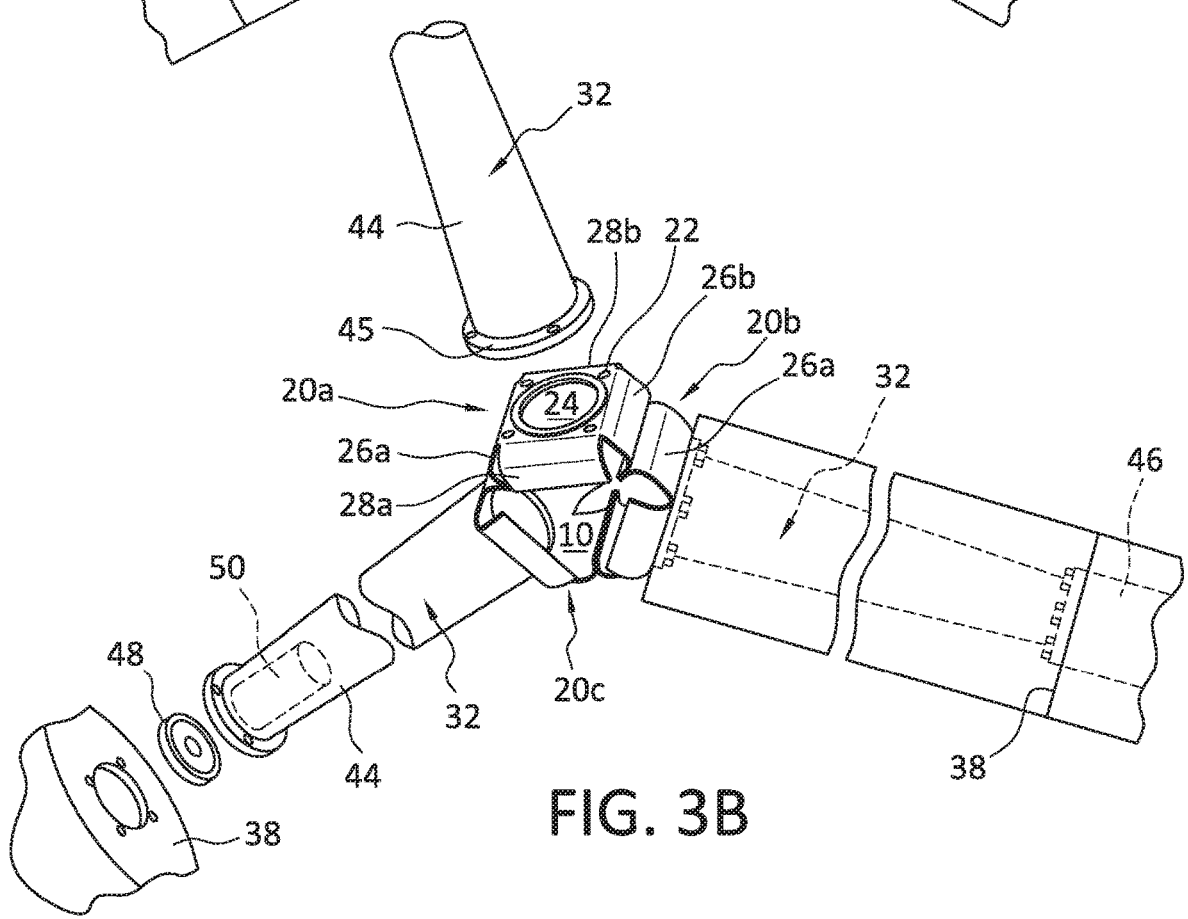
FIG. 3B is an exploded, perspective view of FIG. 3A, illustrating the manner of attachment of the blade root extensions to the modular hub and the pitch motors mounted inside the blade root extension.

With reference now to FIGS. 1, 3A, and 3B, the hub 10 is a modular hub formed from three interconnected hub sections 20a, 20b, 20c. Each hub section 20a, 20b, 20c includes a flat, blade mounting portion 22 having a centrally-located circular opening 24 as shown. Each hub section 20a, 20b, 20c further includes a pair of opposing side flanges 26a, 26b formed from 120° bends in the plate-like material forming the hub sections 20a, 20b, 20c. These side flanges 26a, 26b are interconnectable to the side flanges 26a, 26b of adjacent hub sections such that the assembled hub 10 is hexagon-shaped as shown in FIG. 3B. Each hub section 20a, 20b, 20c further includes front and back opposing flanges 28a, 28b formed from 90° bends. As will be explained in more detail hereinafter, the front and back opposing flanges 28a, 28b are connected to a cap plate and a mounting plate (shown in later discussed figures) to complete the assembly of the hub 10. In the preferred embodiment, each hub section 20a, 20b, 20c is formed from a single square plate of high-strength steel having spring-like resiliency. The corners of the square plate are cut using, for example, a plasma cutter. The four flanges 26a, 26b, 28a, 28b are then formed by bending. Such fabrication is far less expensive than conventional single-piece casting, and the individual hub sections 20a, 20b, 20c are far easier to transport. While the four flanges 26a, 26b, 28a, 28b of each of the hub sections 20a, 20b, 20c act as strengthening corrugations when the hub sections are bolted together to form the modular hub 10, the resiliency of the modular hub 10 at the joints between the flanges better disperses the stresses applied by the roots of the blades 12a, 12b, and 12c to the centrally-located circular opening 24 in the hub sections 20a, 20b, 20c, thereby advantageously reducing metal fatigue and deformation around the edges of these openings.

Again with reference to FIGS. 1, 3A, and 3B, each of the blades 12a, 12b, and 12c includes a pitch-adjustable blade portion 30, a blade root extender 32, and a blade fairing 34 covering the blade root extender 32. The blade portion 30 has a squared-off base end 38, a tip end 40, a leading edge 41 that cuts into the wind, and a trailing edge 42 opposite the leading edge 41. The blade root extender 32 is formed from a tubular body 44 formed, e.g., from rolled steel. The proximal end of the tubular body 44 is circumscribed by an annular mounting flange 45. Flange 45 is mounted by bolts (not shown) over the circular opening 24 in the blade mounting portion 22 of one of the hub sections 20a, 20b, 20c. A cylindrical mounting sleeve 46 is rotatably connected to the distal end of the tubular body 44 via an annular bearing 48 as shown. Mounting sleeve 46 is fixedly connected within a recess in the base end 38 of the blade portion 30 as indicated in FIG. 3A. A pitch motor 50 having an output shaft connected to the mounting sleeve 46 is installed inside the tubular body 44 as shown in FIG. 3B and operates to rotate the blade portion 30 relative to the blade root extender 32 to a desired pitch during the operation of the wind turbine generator 1. The blade fairing 34 is substantially hollow and contains the blade root extender 32 as shown with its leading edge 54 and trailing edge 56 in substantial alignment with the leading and trailing edges 41, 42 of the blade portion 30. As is evident in FIGS. 1 and 3A, the fairing 34 is affixed to the blade root extender 32 and cannot rotate in order to adjust pitch. Accordingly, the pitch of the fairing 34 of each of the blades 12a, 12b, and 12c is oriented into a position that maximizes wind energy conversion at an expected average wind speed. The squared-off distal edge 38 of the fairing 34 abuts the squared off base end 38 of the blade portion 30 as shown. The proximal edge 60 of the fairing 34 abuts the flat, blade mounting portion 22 of the hub section 20a, 20b, 20c that is mounted on. The proximal edge 60 further includes an extended, triangular portion 62 that abuts the interconnected side flanges 26a, 26b adjacent to the trailing side of the flat, blade mounting portion 22 of the hub section. As is evident in FIG. 3A, the extended, triangular portion 62 at the proximal end of each fairing 34 provides each blade 12a, 12b, and 12c with a continuous, wind-capturing aerodynamic surface all the way up to the hexagonal exterior of the hub 10 such that each portion of the length of each blade effectively converts wind energy into useful torque. By contrast, the base ends of many prior art blades simply include a non-aerodynamic blade root incapable of capturing useful wind energy.

FIGS. 4A-4D illustrate the relative dimensional ratios of each of the blades 12a, 12b, and 12c as compared to conventional blades (indicated in phantom) used in 3-megawatt wind turbines. While only the blade 12a is illustrated, all of the blades of the rotor 3 are identical in proportion and structure. With reference to FIG. 4A, the ratio of minimum thickness $T_{min}$ to maximum thickness $T_{max}$ of the blade 12a is about 8:1. By contrast, the ratio of minimum thickness $T_{min}$ to maximum thickness $T_{max}$ in a conventional blade is about twice as much, or 15:1. As indicated in FIG. 4B, the ratio of minimum width $W_{min}$ to maximum width $W_{max}$ is about 4.5:1 in the inventive blade 12a. By contrast, the ratio of minimum width $W_{min}$ to maximum width $W_{max}$ is again about twice as much, or 9:1 compared to conventional blades. Finally, the inventive blades end in a rearward blade sweep 65 wherein both the chord and thickness of the blade increase as best seen in FIG. 4D. The use of a fairing 34 over the blade root extender 32 advantageously provides an aerodynamic surface over the entire length of each blade 12a, 12b, and 12c. The alignment of the leading edge 54 and trailing edge 56 of the fairing 34 the leading and trailing edges 41, 42 of the blade portions 30 extends the width of the blade airfoil near their base ends, providing greater airfoil area for increased energy production. The power generating advantages associated with the use of a fairing are evident when the tables of FIGS. 5A and 5B are compared. The lesser tapering of the blades 12a, 12b, and 12c along their lengths toward their tip ends 40, plus the provision of a rearward blade sweep increases the useful airfoil surface of the inventive blade even more over convention blades used in 3-megawatt wind turbines.

The cumulative effect of all of these design features is summarized in the tables shown in FIGS. 5A and 5B. The resulting aspect ratio ($L^2$/Area) of the inventive blades 12a, 12b, and 12c using a fairing is an unusually low value of 15. The resulting solidity of the rotor 3 is unusually high at 6.0%, as is the specific power (Power/Swept Area) of 0.27, which translates into a specific power rating of 266 watts/m$^2$ in the case of a blade length of 58 meters. While the larger blade area also has the effect of increasing the moment forces and hence the potential stresses applied to the hub 10 by the proximal ends of the blade root extenders 32, the greater resiliency afforded by the use of interconnected hub sections 20a, 20b, 20c formed from a single piece of bent steel plate advantageously dissipates much of the increased stresses at the blade-hub interface.

FIG. 6A is a Cp graph illustrating the power generating performance of a rotor 3 of the invention having blades 12a, 12b, and 12c of about 60 meters in length and capable of generating about 3 megawatts of power in winds having an average wind speed of between about 7.5 and 8.5 meters/ second. Curves are provided both for rotors using the inventive blades with fairings 34 ("21 CW w stall fairing") and without fairings 34 ("21 CW baseline"). This graph further includes, for comparison purposes, the power generating performance of the rotors of three different commercially-available wind turbines rated at 3 megawatts. Here, Cp is the ratio between the resulting rotor power and the dynamic power in the wind, while TSR is the ratio between the speed of the rotating blade tip to the speed of the wind. Here, it is evident that, when the blades of the invention are used either with fairings 34 or without, the blades 12a, 12b, and 12c of the invention extract more wind power completely across the entire range of the average wind speed of between about 6.0 and 8.5 meters/second. What is particularly surprising is how much more wind power is extracted at the lower half of the wind speeds (i.e. less 7.5 m/s). For example, at a TSR of 6.5 (corresponding to a wind speed of 8 m/s) a rotor 3 using the inventive blade with a fairing 34 is 38% more effective with a Cp of 4.75 than the average Cp (3.43) of the three rotors using commercially-available blades. Interestingly, a rotor 3 using the inventive blade without a fairing is still 31% more effective over this average (compare the Cp of 4.5 with the average Cp of 3.43 of the conventional rotors). These efficiency differences become even larger at the lowest average wind speed of 7 m/s, corresponding to a TSR of 4.0. Here, a rotor 3 using the inventive blade with a fairing 34 is 55% more effective with a Cp of 2.2 than the average Cp (1.1) of the three rotors using commercially-available blades. Even rotor using the inventive blades without a fairing 34 is 50% more effective with a Cp of 2.0 vs, an average Cp of 1.1 for the conventional rotors.

FIG. 6B is a graph comparing the net mean power output of an approximately 3 mW rotor 3 using the inventive blades at an average wind speed of 8.56 m/s, with four commercially-available rotors using conventional blades capable of producing between about 2.5 and 3.2 megawatts. In this comparison, the inventive rotor 3 and the four commercially-available rotors all have a rotor diameter of 100 meters. Again, it is evident that a rotor 3 utilizing the inventive blades produces more power at any wind speed than the average of the four other rotors having conventional blades. The table shown in FIG. 6C translates the information contained in the graph of FIG. 6B into kilowatt hours per year. Since the average annual kilowatt hour production of all four of the commercially-available rotors is 10,253, a rotor having the inventive blades produces on average 26% more power. Even if only the highest producing commercially-available rotor is considered (which produces 11,526 kilowatt hours per year) a rotor using the inventive blades still produces 12% more power per year.

The table of FIG. 7 demonstrates that the power production of the inventive rotor 3 is even more impressive under an average wind condition of 6.65 meters/second. Under such conditions, the highest producing commercially-available rotor would produce 7,446 kilowatt hours per year. By contrast, the inventive rotor 3 would produce 8,918 kilowatt hours per year, which amounts to a 20% increase. And if the average production of all three commercially-available rotors (i.e. 6,212 kilowatt hours per year) is compared to the 8,918 kilowatt hours per year of the inventive rotor, the inventive rotor produces 44% more power.

FIG. 8A-8D illustrate the component parts and assembly of the modular hub 10 in greater detail. In addition to the three hub sections 20a, 20b, and 20c, the hub 10 further includes both an end cap 69 having cap flanges 71a, 71b, and 71c connected to the front flanges 28a of each of the three sections, and a connector plate 73 connected to the back flanges 28b of each of the three sections. The flange-to-flange connections between the end cap 69 and the hub sections 20a, 20b, and 20c impart strength and integrity to the hub 10 without unduly limiting the resiliency of the hub. The connections between the back flanges 28b of the hub sections 20a, 20b, and 20c tend to stiffen the hub while affording a means to connect the hub 10 to a conical adaptor 75 (shown in FIG. 9) that is in turn connected to the proximal end 77 of the drive shaft 14. The distal end 79 of the drive shaft 14 is in turn connected to the input of a gearbox 89 within the nacelle 5 as will be discussed later. During assembly, the back flanges 28b and side flanges 26a, 26b of the hub sections 20a, 20b, and 20c are bolted together in the sequence indicated in FIGS. 8A and 8B. Next, the flanges 71a, 71b, and 71c of the end cap 69 are bolted on to the front flanges 28a of the hub sections 20a, 20b, and 20c to complete the assembly of the hub 10.

With reference to FIG. 9, the nacelle 5 includes a housing 82 containing a bed plate or support plate 84. The bed plate 84 is rotationally mounted to the top end of the support tower 7 via the yaw bearing 6. One or more yaw control motors (not shown) are also contained within the nacelle housing 82 and for turning the turning the nacelle 5 on the yaw bearing 6 so that the sweep of the rotor 3 is maintained orthogonally with respect to the direction of the wind. Such yaw motors and the systems that control them are well known in the art and form no part of the invention. A pair of spaced-apart bearings 86a, 86b mounted onto the bed plate 84 annularly capture and rotatably support the drive shaft 14 as shown. The dual support afforded by the bearings 86a, 86b advantageously isolates the distal end 79 of the drive shaft from the bending or moment forces applied to the proximal end 77 of the driveshaft by the rotor blades 20a, 20b, 20c acting on the hub 10. This is important since the distal end 79 is connected to the input shaft 87 of the gearbox 89, and since such bending forces can adversely affect the proper alignment of the gears within the gearbox 89, which in turn can accelerate wear and the need for expensive maintenance procedures. To further resist such bending forces, the proximal end 77 of the driveshaft may have an enlarged, frustro-conical diameter as shown to provide added strength.

With reference to FIGS. 10 and 11, the output shaft of the gearbox 89 is connected to an input shaft of an electrical generator 91. In the preferred embodiment, the generator 91 is a high-density permanent magnet generator, for three reasons. First, such generators are generally lighter and smaller than coil-type generators conventionally used in wind turbine generators, thereby facilitating transportation and assembly of the generator 91. Second, and more importantly, such generators produce higher energy outputs at the low rpms associated with lower wind speeds. Third, the generation of higher amounts of energy at lower rpms allows the use of a simpler, planetary gear type gear train having a gear ratio on the order of 1:10 which is more reliable and robust and which requires less maintenance than the 1:100 gear ratio drive trains used in most prior art wind turbine generators. While such permanent magnet generators require the use of a converter to convert the DC output into useful AC current, the converter is preferably not located in the nacelle 5 but instead is located closely beside the support tower 7 and connected to the output of the generator 91 via a low-resistance cable (not shown).

FIGS. 12A and 12B illustrate the advantages associated with the relatively greater stiffness that the aforementioned aspect and dimensional ratios afford to the inventive blades. FIG. 12A illustrate how the incoming winds cause the blades 12a, 12b, and 12c to flex toward the support tower 7. During unusually high winds, such blade flexing can potentially bring the tip ends 40 of the rotor blades 12a, 12b, and 12c close enough to make destructive contact with the support tower 7, particularly when they are in the 6 o'clock position. However, the increase in both the thickness and the width of the inventive blades over their respective length, in combination with the use of a steel blade root extender 32 having a length of between about 20% and 30% of the over-all length of the blade, advantageously increases the overall stiffness of the blades of the invention, making it less likely that the moment force applied during unusually strong winds will bend the rotating blades 12a, 12b, and 12c into destructive contact with the support tower 7. This stiffness aspect of the blades 12a, 12b, and 12c is particularly advantageous when the blades are combined with the modular hub 10. As previously mentioned, the four flanges 26a, 26b, 28a, 28b of each of the hub sections 20a, 20b, 20c act as strengthening corrugations when the hub sections are bolted together to form the modular hub 10, thereby reinforcing the ability of the blades 12a, 12b, and 12c to resist bending toward the support tower 7 during unusually strong winds.

FIG. 12B best illustrates this particular advantage of the invention, where the maximum expected amount of blade flexure (indicated in phantom) under high wind conditions still keeps the blades well away from destructive contact with the support tower 7. The low blade flexure afforded by the stiffer blades 12a, 12b, and 12c and stronger hub 10 of the invention results in three advantages. First, little or no blade conicity is required. In prior art wind turbine generators, each of the blades of the rotor are tilted at an angle θ—known as the angle of conicity—toward the wind to ensure that destructive contact does not occur between the blades and the support tower during high wind conditions. This angle θ is typically between 4° and 6°. While such blade conicity is effective in providing a margin of safety for the wind turbine generator, it also reduces the efficiency of the rotor in converting wind energy to rotary power. The invention obviates the need for such a loss in efficiency by either reducing the amount of conicity required or eliminating it altogether. Second, little or no tilting of the rotor relative to the axis of rotation is required. Similar to the concept of conicity, many prior art wind turbine generators tilt the rotor an angle α relative to the axis of rotation A of the rotor in order to ensure that destructive contact does not occur between the blades and the support tower during high wind conditions. This angle α is typically between 4° and 6°. Again, the invention obviates the need for the consequent reduction in efficiency of the rotor by either reducing the amount of rotor tilting required or eliminating it altogether. Finally, the reduction in blade flexure allows the wind turbine generator 1 to continue to capture energy over unusually high-wind conditions instead of being shut down by pitching the blade edges parallel to the incoming wind, thereby increasing its overall power output.

With reference now to FIG. 13, the diameter d of the yaw bearing 6 at the top of the support tower 7 and the diameter D at the bottom of the support tower 7 just above the foundation 18 is preferably between about 1.7 to 2.1. By contrast, in prior art support towers, this ratio is no more than 1.37. Such proportioning of the upper and lower diameters d and D lowers the pressure that the inventive wind turbine generator 1 applies to the foundation 18 by about 50%, since the weight of the wind turbine generator 1 is distributed over twice the area of a conventional wind turbine generator. Additionally, the support tower 7 used in the wind turbine generator 1 of the invention is preferably a low-weight, modular support tower, an example of which is disclosed in U.S. Pat. No. 8,136,329 issued on Mar. 20, 2012. Such a modular support tower 7 in which the ratio of the diameter d of the yaw bearing 6 at the top of the support tower 7 and the diameter D at the bottom of the support tower 7 is between about 1.7 to 2.1 can reduce the pressure applied by the wind turbine generator 1 to the foundation 18 by about 66%. This lower pressure not only allows the thickness of the foundation 18 to be reduced 60% to 66%, but also allows relatively low-cost, conventional concrete to be used instead of high-cost, high-pressure rated concrete. The substantially thinner foundation 18 also substantially reduces the over-all amount of concrete needed to construct the foundation. This not only reduces the labor and material costs of construction, but also minimizes the amount of water runoff associated with the foundation 18, as the substantially smaller foundation 18 allows more of the surrounding terrain to maintain its water absorbency. All of these factors are particularly important for the wind turbine generator 1 of the invention, which will likely be constructed on ridges or other high terrain in order to gain exposure to the highest winds in the low-to-moderate wind areas where these turbines are to be built.

While not expressly illustrated in any of the several figures, one other advantageous aspect wind turbine generator 1 of the invention is that none of its power conditioning components located within the support tower 7. Instead, these components are located in a separate building outside of the wind turbine generator 1. A DC cable connects the permanent magnet generator 91 to the power conditioning components located in the separate building. Such a design advantageously removes the sensitive power conditioning equipment that converts the DC current generated by the permanent magnet generator into usable AC current from the mechanical shocks, vibration, and electric flux present within the support tower, thereby reducing the need for maintenance and prolonging the life of this equipment.

While this invention has been described with respect to a preferred embodiment, other modifications, variations, and additions to the invention will become apparent to persons of skill in the art, and all such modifications, variations, and additions are intended to be within the scope of this invention, which is limited only by the claims appended hereto and their various equivalents.

The invention claimed is:

1. A wind turbine generator configured to generate over about 2.7 megawatts of electrical power from winds having an average wind speed of between about 6.0 and 7.5 meters/second, comprising:
   a rotor including a hub, and a plurality of aerodynamic blades having a length defined between a proximal end mounted on the hub, and a blade tip at a distal end;
   a nacelle including a support plate, and a gear train having an output shaft connected to an input shaft of a generator, and a drive shaft rotatably mounted on the support plate and having a distal end connected to the hub and a proximal end connected to an input shaft of the gear train,
   wherein the specific power rating generated by the plurality of aerodynamic blades over an area swept by the aerodynamic blades is at least about 250 watts/m$^2$,
   wherein the aerodynamic blades have an aspect ratio of between about 15 and 19, the aspect ratio of each aerodynamic blade being defined by the square of the length of the blade divided by an area of the blade taken along a blade chord, and
   wherein the rotor solidity of the plurality of aerodynamic blades is between about 4.7% and 6.0%.

2. The wind turbine generator defined in claim 1, wherein the blade chord of each of the aerodynamic blades is longest at a proximal end abutting the hub, and becomes progressively shorter along the blade length toward the distal end, whereupon the blade chord increases before finally decreasing at the distal end.

3. The wind turbine generator defined in claim 1, wherein an aspect ratio of length to width of each of the aerodynamic blades is not more than about 17, and wherein the blade solidity of the plurality of aerodynamic blades is at least 5.0%.

4. The wind turbine generator defined in claim 1, wherein the thickness of the aerodynamic blades increases at the blade tips.

5. The wind turbine generator defined in claim 1, wherein the blade tips include a rearward blade sweep.

6. The wind turbine generator defined in claim 1, wherein the specific power rating of the plurality of aerodynamic blades is at least about 260 watts/m$^2$.

7. The wind turbine generator defined in claim 1, wherein an aspect ratio of length to width of each of the aerodynamic blades is not more than about 16.

8. The wind turbine generator defined in claim 1, wherein each of the aerodynamic blades includes a blade portion having a length that terminates in the blade tip; a blade root having one end connected to the blade portion, and an opposite end that forms the proximal end of the aerodynamic blade mounted on the hub, and an aerodynamic fairing that covers a length of the blade root, wherein the blade root is less flexible along its length than the blade portion.

9. The wind turbine generator defined in claim 1, wherein the specific power rating of the plurality of aerodynamic blades is at least about 260 watts/m$^2$, and an aspect ratio of length to width of each of the aerodynamic blades is not more than about 15.

10. The wind turbine generator defined in claim 1, wherein the hub includes a plurality of interconnectable hub sections having a same shape.

11. The wind turbine generator defined in claim 10, wherein each hub section is formed from a single piece of resilient plate material bent at its sides.

12. The wind turbine generator defined in claim 11, wherein the hub further comprises a mounting plate connected to the drive shaft, and a cap plate connected to a front of the hub, wherein each hub section includes a central, plate-shaped blade mounting portion flanked along an axis of rotation of the hub by front and back connecting flanges that are integrally formed with the blade mounting portion by bends, wherein the front and back connecting flanges are connectable to the cap plate and the mounting plate, respectively.

13. The wind turbine generator defined in claim 1, further comprising a pair of spaced-apart bearings mounted on the support plate that rotatably support the distal and proximal ends of the drive shaft, the spaced-apart bearings being configured to isolate the input shaft of the gear train from bending forces applied to the distal end of the drive shaft by the plurality of aerodynamic blades.

14. The wind turbine generator defined in claim 1, wherein a diameter of the drive shaft increases toward its distal end to resist bending forces applied to the drive shaft by the plurality of aerodynamic blades.

15. The wind turbine generator defined in claim 1, wherein a length of the drive shaft is substantially the same as a length of the hub along an axis of hub rotation.

16. The wind turbine generator defined in claim 1, wherein the gear train is a two-stage gear train.

17. The wind turbine generator defined in claim 1, further comprising a modular tower having a frustro-conical shape, and a foundation that vertically supports the rotor, nacelle, and drive shaft,
wherein a ratio between a diameter of a top end of the modular tower that supports the nacelle and a diameter of a bottom end of the modular tower that overlies the foundation is between about 1.7 and 2.1.

18. The wind turbine generator defined in claim 1, further comprising a tower having a frustro-conical shape, and a foundation that vertically supports the rotor, nacelle, and drive shaft, wherein a ratio between a diameter of a circular yaw bearing at a top end of the tower that supports the nacelle and a diameter of a bottom end of the tower that overlies the foundation is between about 1.7 and 2.1.

19. A wind turbine generator configured to generate over about 2.7 megawatts of electrical power from winds having an average wind speed of between about 6.0 and 7.5 meters/second, comprising:

a rotor including a hub, and a plurality of aerodynamic blades having a length defined between a proximal end mounted on the hub, and a blade tip at a distal end;
a nacelle including a support plate, and a drive shaft rotatably mounted on the support plate and having a distal end connected to the hub,
wherein the specific power rating generated by the plurality of aerodynamic blades over an area swept by the aerodynamic blades is at least about 250 watts/$m^2$,
wherein the aerodynamic blades have an aspect ratio of between about 15 and 19, the aspect ratio of each aerodynamic blade being defined by the square of the length of the blade divided by an area of the blade taken along a blade chord,
wherein the hub includes a plurality of interconnectable hub sections formed from a single piece of resilient plate material bent at its sides.

20. A wind turbine generator configured to generate over about 2.7 megawatts of electrical power from winds having an average wind speed of between about 6.0 and 7.5 meters/second, comprising:

a rotor including a hub, and a plurality of aerodynamic blades having a length defined between a proximal end mounted on the hub, and a blade tip at a distal end;
a nacelle including a support plate, and a drive shaft rotatably mounted on the support plate and having a distal end connected to the hub,
wherein the specific power rating generated by the plurality of aerodynamic blades over an area swept by the aerodynamic blades is at least about 250 watts/$m^2$,
wherein the aerodynamic blades have an aspect ratio of between about 15 and 19, the aspect ratio of each aerodynamic blade being defined by the square of the length of the blade divided by an area of the blade taken along a blade chord, and
wherein the blade chord of each of the aerodynamic blades is longest at a proximal end abutting the hub, and becomes progressively shorter along the blade length toward the distal end, whereupon the blade chord increases before finally decreasing at the distal end.

* * * * *